(12) United States Patent
Tounosu et al.

(10) Patent No.: US 7,737,586 B2
(45) Date of Patent: Jun. 15, 2010

(54) ROTATING ELECTRIC MACHINE

(75) Inventors: Shigeki Tounosu, Hitachi (JP); Kengo Iwashige, Hitachi (JP); Ryuichiro Iwano, Hitachi (JP); Mitsuru Saeki, Hitachinaka (JP); Kenichi Hattori, Hitachiota (JP); Kazuhiko Takahashi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 109 days.

(21) Appl. No.: 12/194,207

(22) Filed: Aug. 19, 2008

(65) Prior Publication Data

US 2009/0058205 A1    Mar. 5, 2009

(30) Foreign Application Priority Data

Sep. 3, 2007   (JP) .............................. 2007-228063

(51) Int. Cl.
H02K 1/32     (2006.01)
(52) U.S. Cl. ............................. 310/61; 310/52; 310/54; 310/58
(58) Field of Classification Search ............. 310/52–59, 310/61, 214–215
See application file for complete search history.

(56) References Cited

U.S. PATENT DOCUMENTS

| | | | |
|---|---|---|---|
| 3,119,033 A * | 1/1964 | Horsley et al. ................ | 310/64 |
| 4,298,812 A * | 11/1981 | Damiron et al. ............... | 310/61 |
| 5,698,924 A * | 12/1997 | Nishida ....................... | 310/214 |
| 6,288,461 B1 * | 9/2001 | Mori et al. .................... | 310/58 |
| 6,459,180 B1 * | 10/2002 | Mori et al. .................... | 310/61 |
| 6,774,515 B2 * | 8/2004 | Mori et al. .................... | 310/61 |
| 7,462,962 B2 * | 12/2008 | De Bock et al. .............. | 310/58 |
| 7,498,711 B2 * | 3/2009 | Biais .......................... | 310/214 |

FOREIGN PATENT DOCUMENTS

| | | |
|---|---|---|
| JP | 09-285052 | 10/1997 |
| JP | 10-178754 | 6/1998 |
| JP | 2000-139050 | 5/2000 |
| JP | 2005-210893 | 8/2005 |

* cited by examiner

Primary Examiner—Thanh Lam
(74) Attorney, Agent, or Firm—Mattingly & Malur, P.C.

(57) ABSTRACT

A rotating electric machine wherein sub slots serving as cooling fluid ducts in the axial direction are provided at the bottoms of the coil slots formed in the rotor, radial cooling fluid ducts are formed through the field coil of the rotor in the radial direction of the rotor and juxtaposed in the axial direction of the rotor, so as to communicate the sub slots with the air gap, and radial cooling fluid ducts are formed through the stator in the radial direction of the stator and juxtaposed in the axial direction of the rotor, corresponding in position to the radial cooling fluid ducts in the rotor, so as to communicate the inner periphery of the stator with the outer periphery of the stator.

11 Claims, 9 Drawing Sheets

DISTANCE IN THE AXIAL DIRECTION OF ROTOR

DISTANCE IN THE AXIAL DIRECTION OF ROTOR

ROTATING ELECTRIC MACHINE

BACKGROUND OF THE INVENTION

The present invention relates to a rotating electric machine such as a turbine generator having its rotor provided with a ventilation mechanism which directly cools the rotor with cooling fluid.

In general, a mechanism is well known wherein ventilation ducts are provided in the stator or the rotor of a rotating electric machine such as a turbine generator, and cooling fluid such as air or hydrogen gas is passes through the ventilation ducts so that the coils and the iron cores heated up due to the generated joule loss and iron loss are cooled down.

From the viewpoint of achieving a high cooling performance, a direct cooling system which cools the coils by putting them in direct contact with cooling fluid is widely employed as a mechanism for cooling the rotor. Recent requirements have been for the compatibility of the scale-up of the rotating electric machines and the reduction in the costs of such high capacity machines. The high capacity requirements tend to increase the length of the rotor in the direction along the rotor shaft of the rotating electric machine.

A typical structure of the conventional ventilation mechanism for use in a rotating electric machine will now be described in reference to FIGS. 16~19.

Figure 16:
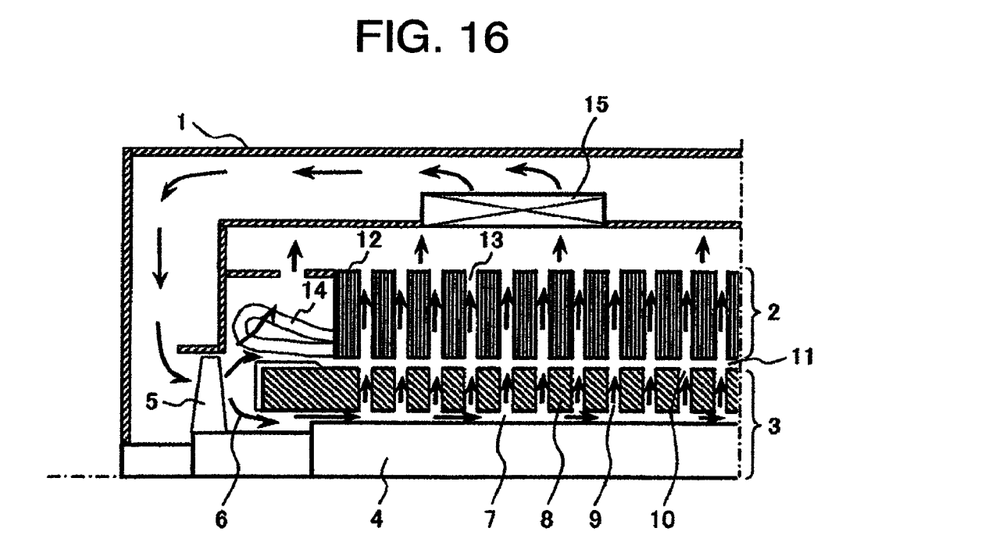
FIG. 16 shows in vertical cross section the upper half of the conventional turbine generator having a rotor of radial flow cooling type.

FIG. 16 schematically shows in vertical cross section a part of a turbine generator having the rotor provided with a radial flow cooling system. In FIG. 16 are shown a turbine generator 1, a stator 2, a rotor 3 and a rotor shaft 4.

An axial fan 5 installed near one end of the rotor shaft 4 generates the flow of cooling fluid 6 (depicted with arrows) passing through the various ventilation ducts in the rotating electric machine. Sub slots 7 to serve as ventilation ducts for conducting the cooling fluid 6 through the rotor 3 are provided underneath the coil slots of the rotor 3, running along the rotor shaft 4. Rotor field coil (of electric conductor) 8 of laminated structure are fitted in the coil slots formed above the sub slots 7. Radial ducts (holes: radial cooling fluid ducts) 9 for guiding the cooling fluid from the sub slots 7 into the laminated field coils 8 are cut in the laminated field coils 8 in the radial direction of the rotor 3. The radial ducts 9 are juxtaposed at a predetermined interval in the axial direction of the rotor and the discharging holes 10 of the radial ducts 9 are also juxtaposed on the outer circumferential surface of the rotor 3 in the axial direction of the rotor 3.

An air gap 11 is defined between the inner circumferential surface of the stator 2 and the outer circumferential surface of the rotor 3.

The iron core 12 of the stator 2 is provided with stator cooling ducts (cooling fluid ducts) 13 which are juxtaposed in the axial direction of the rotor shaft 4 and serve as radial ventilation ducts (holes) for guiding the cooling fluid 6 through the stator 2. Reference numeral 14 indicates the stator coil of electric conductor fitted in the stator coil slots, and numeral 15 denotes a cooler for cooling down the cooling fluid 6 whose temperature is elevated as a result of cooling the parts of the turbine generator 1.

The constituent elements (before lamination) of the field coils 8 are flat plates (not shown) of electric conductor and each element has ventilation holes arranged in the axial direction. A plurality of such elements are stacked (laminated) one upon another in the radial direction in such a manner that the ventilation holes are registered one upon another to form plural juxtaposed radial ducts 9 arranged in the axial direction of the field coils 8.

These plural radial ducts 9 are communicated with the sub slots 7 provided at the bottom of the field coil 8. When the rotor 3 starts rotating, the cooling fluid 6 flows into the sub slots 7 due to the pumping action caused by the pushing force of axial fan 5 and the centrifugal force created in the radial ducts 9. Part of cooling fluid 6 forced out by the axial fan 5 flows toward the air gap 11 and the far end of the stator coil 14. Part of the cooling fluid 6 entering the sub slots 7 is distributed into the respective radial ducts 9 while flowing from the central position of the rotor shaft 3 toward the far end thereof. Then, the cooling fluid 6 cools the field coils 8 while it is flowing through the radial ducts 9, and the cooling fluid 6 is discharged from the outlet holes 10 of the radial ducts 9 into the air gap 11. Thereafter, the cooling fluid 6 flows from the air gap 11 into stator cooling ducts 13, cools the iron core 12 and the stator coil 14, and joins that part of the cooling fluid 6 which has cooled the end of the stator coil 14. Next, the confluent cooling fluid 6 whose temperature is elevated as a result of having cooled the heat generating parts, flows into the cooler 15 for lowering the temperature of the cooling fluid 6. The thus cooled fluid 6 finally returns to the axial fan 5 to complete the whole circulation.

The rotors of radial flow cooling type are disclosed in, for example, JP-A-09-285025, JP-A-2005-210893 and JP-A-10-178754.

The rotors of radial flow cooling type are advantageous in that both facility in fabrication of the rotor 3 and reduction in production cost can be attained since plural radial ducts 9 can be formed in the field coils 8 simply by stacking (laminating) flat conductors of the same structure in the radial direction. On the other hand, since the cooling of the field coil 8 is performed by distributing the cooling fluid 6 flowing through the sub slots 7 into the respective radial ducts 9 in the order of increasing distance from the axial fan 5, the rate of flow of the cooling fluid 6 decreases with the distance from the axial fan 5 due to the increase in the flow resistance as the distance from the axial fan 5 increases. This situation gives rise to a problem that the temperature of the field coil 8 becomes higher near the central part thereof. Therefore, this problem has made it difficult to increase the axial length of the rotor 3 for higher capacity. Thus, the rotors of radial flow cooling type have been applied to relatively small capacity machines having ratings of up to 100 MVA.

There is another type of rotor, i.e. rotor of gap pick up diagonal flow cooling type, known in, for example, JP-A-2000-139050.

Figure 17:
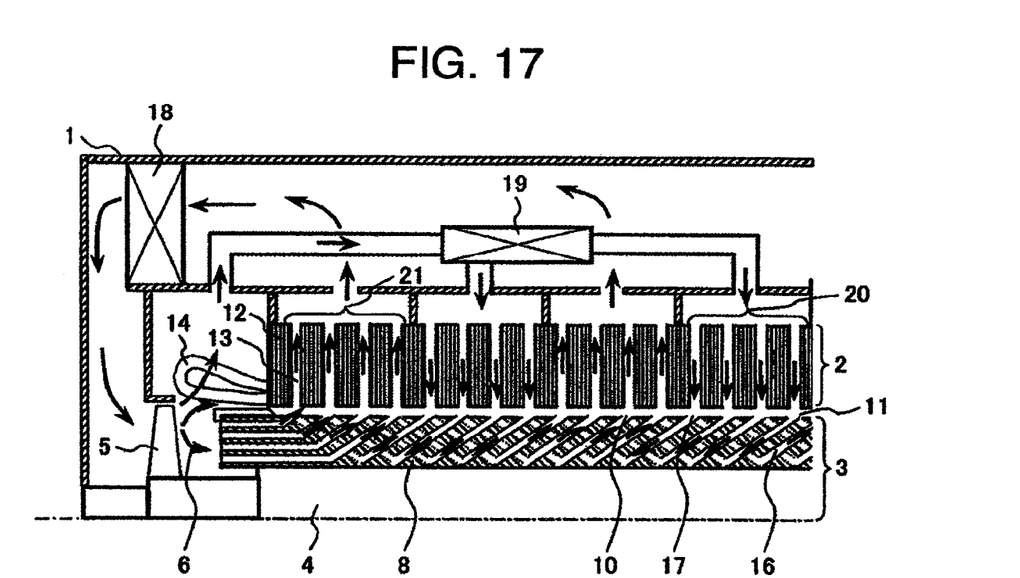
FIG. 17 shows in vertical cross section the upper half of the conventional turbine generator having a rotor of gap pick up diagonal flow cooling type.

FIG. 17 schematically shows in partial cross section of a turbine generator having a rotor of gap pick up diagonal flow cooling type.

The laminated field coil 8 of the rotor 3 has V-shaped diagonal ducts 16 cut therein, and the holes 17 of the diagonal ducts 16 are formed in the outer surface of the rotor 3. A main cooler 18 serves to cool down the cooling fluid 6 whose temperature is elevated as a result of having cooled parts of the turbine generator, and a sub cooler 19 is provided for the same purpose.

In the stator 2 are provided stator cooling ducts 13 in juxtaposition in the axial direction of the turbine generator.

According to this type of rotor as described above, there are defined the reverse zone 20 where the cooling fluid 6 flows through the stator cooling ducts 13 inwardly in the radial direction and the forward zone 21 where the cooling fluid 6 flows through the stator cooling ducts 13 outwardly in the radial direction.

The field coil 8 is made up of plural flat shaped conductors (not shown) stacked (laminated) one upon another, each having plural ventilation holes arranged in the axial direction, and the communicated ventilation holes make up the diagonal ducts 16 in the field coil 8. Further, ventilation holes are cut in each flat conductor in two rows arranged in the circumferential direction (i.e. direction parallel to the sheet of the drawing) so that the V-shaped diagonal ducts 16 in the field coil 8 are configured in a net shape.

The cooling fluid 6 forced out by the axial fan 5 first cools the end of the stator coil 14 and then flows into the sub cooler 19, where the temperature of the cooling fluid 6 is lowered. The chilled cooling fluid 6 out of the sub cooler 19 flows into the stator cooling ducts 13 in the reverse zone 20 to cool the iron core 12 and the stator coil 14, and is discharged into the air gap 11. Then, the cooling fluid 6 is conducted through the suction holes (holes) 17 into the diagonal ducts 16 and passes through the diagonal ducts 16 inwardly in the slanted direction to cool the field coil 8. Thereafter, the cooling fluid 6 changes its flow direction at the bottom of the field coil 8, flows outwardly in the slanted direction to cool the field coil 8 again, and is discharged at the discharge holes (holes) 10 into the air gap 11.

The cooling fluid 6 now flows from the air gap 11 into the stator cooling ducts 13 in the forward zone 21, cools the iron core 12 and the stator coil 14, and flows into the main cooler 18. The temperature of the cooling fluid 6 is lowered in the main cooler 18, and the chilled cooling fluid 6 returns to the axial fan 5 to complete the whole circulation.

Figure 18A:
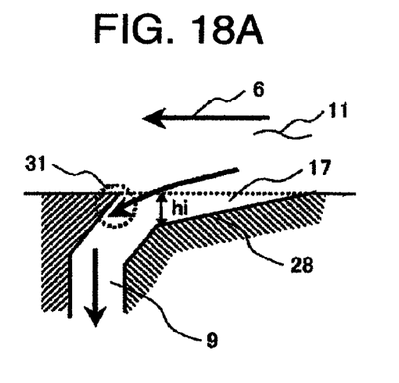
FIGS. 18A and 18B show the operating principle of the gap pick up diagonal flow cooling system.
Figure 18B:
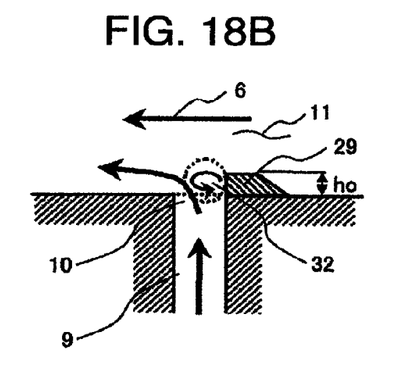
Figure 19:
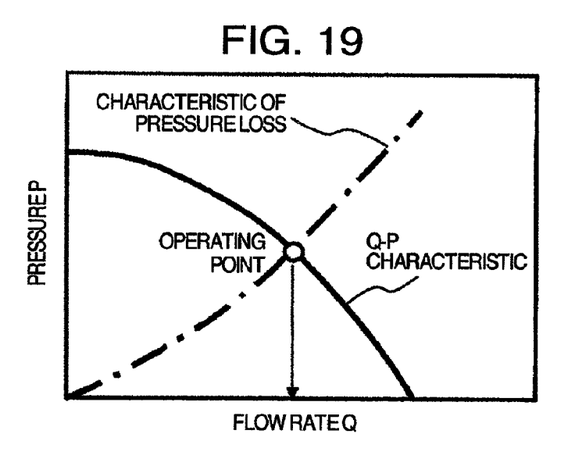
FIG. 19 graphically shows the characteristics of the flow rate vs. fluid pressure and the pressure loss observed in the gap pick up diagonal flow cooling system.

The mechanism of the gap pick up diagonal flow cooling will here be described in reference to FIGS. 18A, 18B and 19.

FIG. 18A shows the structure of the suction hole provided in the rotor cooling duct 9, and FIG. 18B shows the structure of the discharge hole provided in the rotor cooling duct 9.

A cut 28 is formed in the suction hole 17 of the rotor cooling duct 9, and a projection 29 is formed downstream of the discharge hole 10 of the rotor cooling duct 9. Reference numeral 31 indicates a region for raising pressure defined in the suction hole 17, and numeral 32 denotes a region for lowering pressure defined behind the projection 29 at the discharge hole 10.

When the rotor 3 starts rotation, the circumferential flow of cooling fluid 6 is generated in the air gap 11. Since the cuts 28 are formed in the suction holes 17 in the circumferential direction, part of the cooling fluid 6 near the circumference of the rotor 3 is conducted in such a direction as to cause the fluid to collide with the inner walls of the suction holes 17. As the fluid approaches the inner walls, the static pressure of the fluid recovers with the result that the higher pressure regions 31 are formed in the suction holes 17. The symbol hi indicates the depth of the cut 28 of the suction hole 17.

On the other hand, since the projections 29 are formed downstream of the discharge holes 10, the circumferential flow of the cooling fluid 6 creates separation vortices behind the projections 29. As a result, the low pressure regions 32 are formed in the discharge holes 10. The symbol ho denotes the height of the projection 29.

The flow rate of the cooling fluid 6 flowing through the diagonal duct 16 in the rotor depends on the difference between the pressure in the higher pressure region and the pressure in the low pressure region. FIG. 19 shows in graphical representation the relationship between the flow rate Q and the pressure rise P. In FIG. 19, solid curve represents the Q-P characteristic which is similar to that applicable to a pump or a fan, and broken curve gives the pressure loss characteristic of the cooling fluid 6 distributed from the suction hole 17 to the discharge hole 10. The intersection between the Q-P characteristic curve and the pressure loss characteristic curve defines the operating point which determines the flow rate of the cooling fluid 6 through the diagonal duct 16.

In the structure of the rotor having the gap pick up diagonal flow cooling system, the flow rate of the cooling fluid 6 for cooling the field coil 8 is securely maintained by providing plural pairs of suction hole and discharge hole in the circumferential surface of the rotor 3 and forming the diagonal duct 16 between each pair of the suction hole and the discharge hole. This constitution allows the repetition of the unit structures each having the diagonal ducts 16, in the axial direction of the rotor shaft so that uniform cooling performance can be expected in the field coil 8 in the axial direction, which is advantageous in that the axial elongation of the rotor 3 and therefore the scale-up of the capacity of the turbine generator can be realized. On the other hand, the complexity in the employed shape of the cooling fluid ducts results in an increase in production man-hour of the rotor 3 and makes the reduction in cost difficult. Accordingly, this constitution is used only for large capacity machines having ratings of higher than 500 MVA.

SUMMARY OF THE INVENTION

As described above, in the rotor of radial flow cooling type, the flow rate of cooling fluid decreases toward the center of the rotor in the axial direction, and therefore the performance of cooling the field coil may not be satisfactory.

On the other hand, regarding the rotor of gap pick up diagonal flowcooling type, since the ventilation ducts in the field coil have a complicated structure, the man hours for fabricating the rotor is considerable so that reduction in production cost becomes difficult.

The object of the present invention is to provide a rotating electric machine wherein the performance of cooling the field coil of the rotor is maintained at a satisfactory level and, at the same time, reduction in production cost can be realized.

The present invention basically proposes a rotating electric machine as described below in order to better the manufacturability of the rotor and to improve the performance of cooling the field coil of the rotor.

Therefore, there is provided a rotating electric machine having a stator and a rotor disposed inside the stator with an air gap defined between them, the rotor having plural coil slots arranged at a predetermined interval in the circumferential direction of the rotor and a field coil of laminated structure fitted in the coil slots, wherein sub slots for serving as cooling fluid ducts in the axial direction of the rotor are provided at the bottoms of the coil slots;

radial cooling fluid ducts running in the radial direction of the rotor which communicate the sub slots with the air gap, are provided in the field coil of the rotor and juxtaposed in the axial direction of the rotor;

cooling fluid ducts are provided in the stator, running in the radial direction of the stator, corresponding in position to the radial cooling fluid ducts provided in the field coil of the rotor, and communicating the inner periphery of the stator with the outer periphery of the stator;

the cooling fluid ducts in the stator and the radial cooling fluid ducts in the rotor consist of a downward flow path system for guiding the flow of cooling fluid inwardly in the radial direction of the rotating electric machine and an upward flow path system for guiding the flow of cooling fluid outwardly in the radial direction of the rotating electric machine. The downward flow path system and the upward flow path system communicate with each other via the sub slots; and a cooling fluid circulation mechanism is provided to cause the cooling fluid to flow inwardly and outwardly in the radial directions.

For example, the cooling fluid circulation mechanism comprises a cooling fluid intake mechanism for causing cooling fluid to flow into the sub slots, through the radial cooling fluid ducts in the stator constituting the downward flow path system, the air gap, and the radial cooling fluid ducts in the rotor constituting the downward flow path system, in this order named, and a cooling fluid exhaust mechanism for causing cooling fluid to flow out of the sub slots, through the radial cooling fluid ducts in the rotor constituting the upward flow path system, the air gap, and the cooling fluid ducts in the stator constituting the upward flow path system, in this order named; and cooling fluid is circulated through the cooling fluid intake mechanism, the downward flow path system, the sub slots, the upward flow path system, and the cooling fluid exhaust mechanism.

Accordingly, cooling fluid is sucked and discharged at the outer periphery of the rotor, the flow of cooling fluid is generated through the radial ducts in the rotor inwardly and outwardly in the radial directions, and the field coil is effectively cooled entirely in the axial direction.

According to the present invention, plural ventilation ducts can be formed in the field coil, having an easy structure in fabrication similar to those in the rotor of radial flow cooling type. Further, by using the structure wherein the ventilation ducts for the cooling fluid flows inwardly and outwardly in the radial directions are repeated alternately in the axial direction, the rotor can be elongated in its axial direction without adversely affecting the performance of cooling the field coil. Hence, there is an advantage that the capacity of a generator can be increased at a low cost. Namely, according to the present invention, the object of increasing the capacity of a generator by improving the performance of cooling the field coil can be realized only through the simple alteration of structure without impairing the manufacturability of the rotor.

Other objects, features and advantages of the invention will become apparent from the following description of the embodiments of the invention taken in conjunction with the accompanying drawings.

DESCRIPTION OF THE EMBODIMENTS

Embodiments of the present invention will now be described in reference to the attached drawings.

Embodiment 1

The first embodiment of the present invention is described with reference to FIGS. 1A through 4.

Figure 1A:
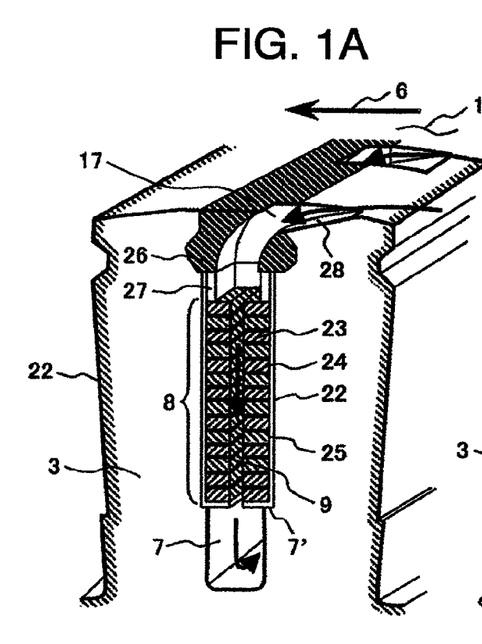
FIGS. 1A and 1B partially show in perspective view the detailed structures of the field coil of the rotor used in the first embodiment of the present invention.
Figure 1B:
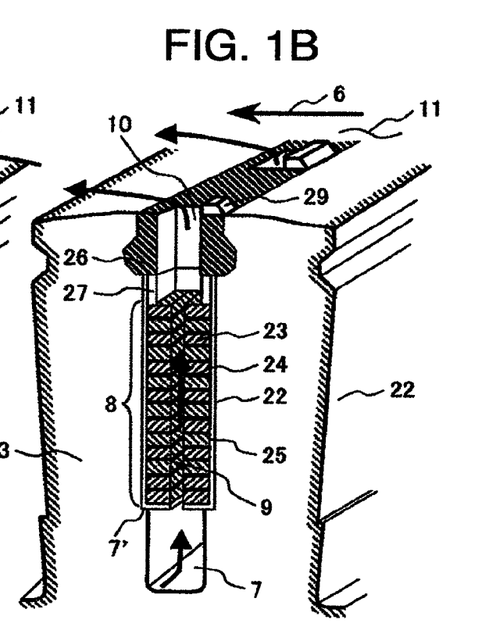

FIGS. 1A and 1B partially show in perspective view the detailed structures of the rotor field coil used in the first embodiment of the present invention. FIG. 1A shows the radial cooling fluid duct 9 on the suction side and the sub slot (cooling fluid duct in the axial direction) 7, and FIG. 1B shows the radial cooling fluid duct 9 on the discharge side and the sub slot 7.

Plural coil slots 22 are cut in the rotor at a predetermined interval in the circumferential direction of the rotor 3. The coil slots 22 open at the outer radial ends thereof, and the filed coil 8 of layered (laminated) structure is fitted into the coil slots 22 by way of these openings.

Insulating members 24 is interposed between the layers of the conductor plates 23 which serve as coil elements of the laminated field coil 8, so as to provide electrical insulation between the adjacent conductor plates 23.

A sub slot 7 for serving as a cooling fluid duct in the axial direction is formed at the bottom of the coil slot 22. The laminated field coil 8 is fitted in the coil slot 22 above the sub slot 7, supported by the shoulder-shaped portions 7' provided in the inner walls of the coil slot 22. A coil support member 25 is inserted between the field coil 8 and the coil slot 22 so as to immobilize the field coil 8. A wedge 26 to fixedly cover the opening of the coil slot 22 serves to prevent the field coil 8 from moving in the radial direction due to the centrifugal force created by the rotation of the rotor 3.

A creepage block 27 is provided to electrically insulate the wedge 26 from the field coil 8.

Figure 2:
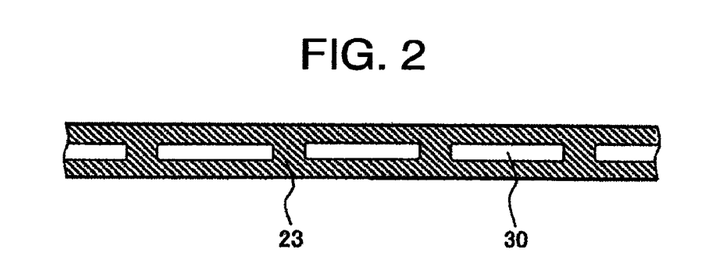
FIG. 2 partially shows in plan the structure of a conductor plate used as an element of the field coil used in the first embodiment of the present invention.

FIG. 2 partially shows in plan the structure of the conductor plate used as an element of the field coil used in the first embodiment of the present invention. As shown in FIG. 2, ventilation holes 30 for serving as part of the radial duct 9 are cut in the conductor plate 23 at a predetermined interval in the axial direction.

Figure 3:
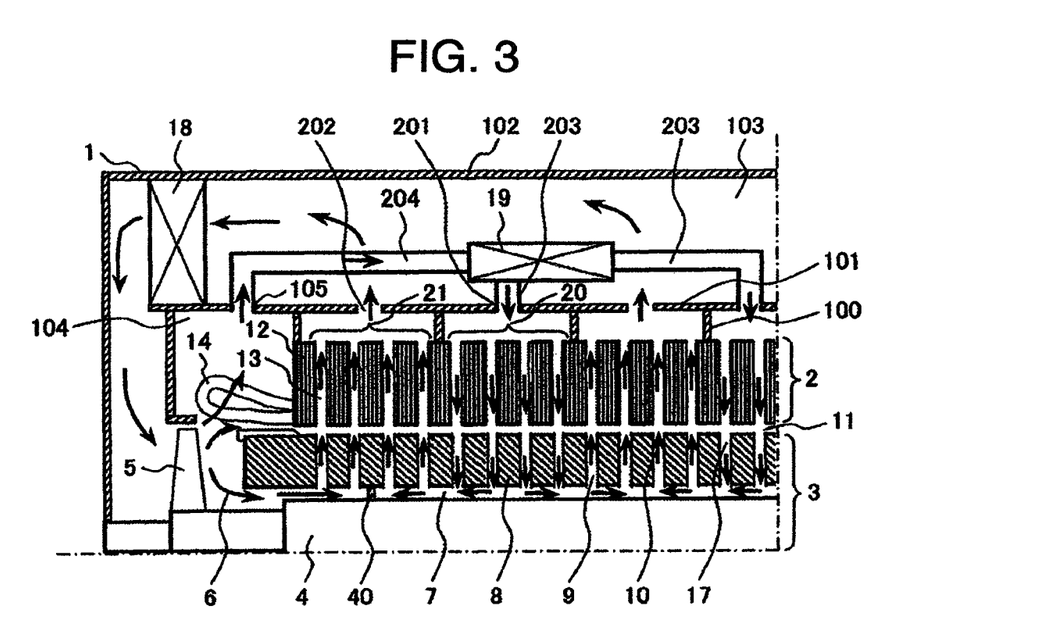
FIG. 3 partially shows in vertical cross section the upper half of the turbine generator used in the first embodiment of the present invention.

FIG. 3 shows in vertical cross section the upper half of the turbine generator having a cooling mechanism according to the first embodiment of the present invention.

Plural, similarly shaped conductor plates 23, each having plural ventilation holes 30 arranged in the lengthwise direction (i.e. in the axial direction of the rotor), are stacked one upon another (laminated) in a coil slot 22 in the radial direction, so that the field coil 8 is formed. Accordingly, plural radial cooling fluid ducts (hereafter referred to simply as radial ducts) 9 are formed in the field coil 8 in the axial direction.

The coil support member 25 surrounding the field coil 8 and the creepage block 27 serve as electric insulation between the field coil 8 and the rotor shaft 4.

Wedges 26 having suction holes 17 and discharge holes 10 serving as parts of cooling fluid ducts are provided at the outermost periphery of the field coil 8 to cover the coil slots 22.

Each wedge 26 is fixed to the rotor shaft 4. In the circumferential direction of the rotor 3, cuts 28 are formed in the suction holes 17 and projections 29 are provided downstream of the discharge holes 10.

The sub slots 7 for serving as ventilation ducts in the axial direction of the rotor are secured at the bottoms of the coil slots 22 formed in the rotor core, that is, near the bottom part of the laminated field coil 8. The sub slots 7 are communicated with the radial ducts 9 formed in the field coil 8.

In FIG. 3, the radial ducts 9 formed in the rotor 3 and the cooling fluid ducts (hereafter referred to also as radial ducts) 13 formed in the stator 2 are both oriented in the radial directions of the rotor 3 and stator 2, respectively, and juxtaposed in the axial direction as in the radial flow cooling system shown in FIG. 16. However, the structure in FIG. 3 is different from the conventional structure shown in FIG. 16 in that these radial ducts 9 and 13 are located into the reverse zones (suction regions) 20 and the forward zones (discharge regions) 21 and that the radial ducts 9 belonging to the reverse zones 20 are communicated with the radial ducts 9 belonging to the forward zones 21 via the sub slots 7. In order to realize such a structure as described above, the following artifice is taken into consideration.

As shown in FIG. 3, a cylindrical cover (inner cylinder) 101 having annular partitions 100 for defining the reverse zones 20 and the forward zones 21 alternately in the axial direction of the rotating electric machine, is provided encasing the stator 2 of the rotating electric machine therein. The reverse zones 20 and the forward zones 21 thus demarcated inside the cylindrical cover 101 further define annular spaces along with the outer periphery of the rotor 3. The suction holes 201 of the reverse zones 20 and the discharge holes 202 of the forward zones 21 are provided alternately in the cylindrical cover 101 in the axial direction. The cooling fluid distribution duct 203 of the sub cooler 19 is connected with each of the suction holes 201.

A cylindrical housing (outer cylinder) 102 for serving as the outer shell of the rotating electric machine encases the cylindrical cover 101 therein. The space between the cylindrical cover (inner cylinder) 101 and the cylindrical housing (outer cylinder) 102 serves as a circulation path 103 for cooling fluid. The discharge holes 202 of the cylindrical cover 101 open so that the forward zones 21 can be communicated with the circulation path 103. The circulation path 103 is communicated with the space in which the axial fan 5 attached to the rotor shaft 4 is located. The circulation path 103 is also communicated with a cooling fluid collecting part 104 provided at one end of the stator 2. A discharge hole 105 cut in the cooling fluid collecting part 104 is connected with the return duct 204 of the sub cooler 19. The main cooler 18 is placed midway in the circulation path 103.

The axial fan 5, the cooling fluid distribution duct 203 and the annular partition 100 constitute a cooling fluid intake mechanism (5, 203, 100) for conducting the cooling fluid 6 into the sub slot 7 via the radial ducts 13 at the stator side which serve as a downward flow path system (cooling fluid ducts constituting the reverse zone 20), the air gap 11, and the radial ducts 9 at the rotor side which serve also as a similar downward flow path system, in this order named. The axial fan 5, the annular partition 100 and the discharge hole 202 constitute a cooling fluid exhaust mechanism (5, 100, 202) for discharging the cooling fluid 6 guided into the sub slot 7 by the cooling fluid intake mechanism (5, 203, 100), via the rotor side radial ducts 9 which serve as an upward flow path system (cooling fluid ducts constituting the forward zone 21), the air gap 11, and the stator side radial ducts 13 which serve also as a similar upward flow path system, in this order named. These series of cooling fluid paths constitute the cooling fluid circulation path. Namely, cooling fluid is circulated through the cooling fluid intake mechanism (5, 203, 100), the radial ducts 13, 9 of the downward flow path system, the sub slot 7, the radial ducts 9, 13 of the upward flow path system, and the cooling fluid exhaust mechanism (5, 100, 202).

In the present embodiment, a partition plate 40 is provided in the sub slot 7 in a position not far from the axial fan 5. The partition plate 40 is provided to keep smooth confluence of the cooling fluid flowing out of the inward radial flow paths (suction ducts) into the sub slot 7.

The general flow of cooling fluid 6 through the flow paths as described above according to the first embodiment of the present invention will be described below in reference to FIG. 3.

The cooling fluid 6 is propelled out by the axial fan 5 first cools the end of the stator coil 14, flows into the sub cooler 19 to be further cooled down, flows into the stator radial ducts 13 constituting the reverse zone 20 via the cooling fluid distribution duct 203 to cool the iron core 12 and the stator coil 14, and is discharged into the air gap 11. Then, the cooling fluid 6 discharged into the air gap 11 is guided into the radial ducts 9 constituting the reverse zone via the suction holes 17 provided in the outer peripheral surface of the field coil 8, and flows through the radial ducts 9 inwardly in the radial direction to cool the field coil 8. Thereafter, the divided flows of the cooling fluid 6 through the radial ducts 9 come together in the sub slot 7; the confluent cooling fluid 6 flows through the sub slot 7 in the axial direction; the confluence branches out into the plural radial ducts 9 constituting the forward zone 21; and the branched flows proceed outwardly in the radial direction to cool the field coil 8 and are discharged into the air gap 11 through the discharge holes 10.

The cooling fluid 6 discharged into the air gap 11 flows into the stator radial ducts 13 constituting the forward zone 21 to cool the iron core 12 and the stator coil 14, flows into the main cooler 18 via the cooling fluid circulation duct 103 to be cooled down, and finally returns to the axial fan 5 to complete the whole circulation.

As described above, although the first embodiment of the present invention employs the radial flow cooling system, it uses the operating principle of the gap pick up diagonal flow cooling system employing the idea of the reverse and forward zones. Accordingly, the field coil 8 can be cooled by sucking the cooling fluid 6 into and discharging the cooling fluid 6 out of, the air gap 11 and creating the flows of the cooling fluid 6 through the radial ducts 9 inwardly and outwardly in the radial direction. According to the first embodiment of the present invention, therefore, an approximately uniform flow rate can be secured for each of the radial ducts 9 arranged in the axial directions with such a conventional cooling mechanism applied to the rotor as the radial flow cooling system, so that the performance of cooling the field coil 8 can be improved.

Figure 4:
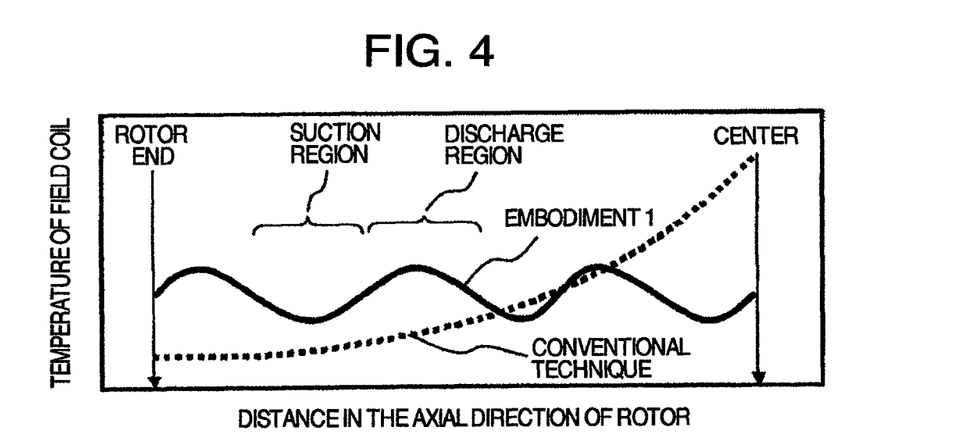
FIG. 4 shows the temperature distribution in the axial direction of the field coil in the first embodiment of the present invention, as compared with that observable in the conventional art.

FIG. 4 shows the temperature distribution in the axial direction of the field coil 8 obtained in the first embodiment of the present invention, as compared with that observed in the conventional radial flow cooling system.

In FIG. 4, broken curve represents the result obtained with the rotor using the conventional radial flow cooling system. It is understood from the broken curve that temperature tends to rise as the axial distance toward the center of the rotor since the flow rate of the cooling fluid 6 decreases as the axial distance toward the center of the rotor.

On the other hand, according to this first embodiment resulting in the characteristic represented by solid curve, temperature distribution is roughly uniform in the axial direction although there is a small undulation in temperature depending on the provision of the suction region (reverse zone) and the discharge region (forward zone).

It is noted here that the region of the field coil 8 corresponding to the reverse zone 20 is termed suction region (region in which cooling fluid flows inwardly in the radial direction) while the region of the field coil 8 corresponding to the forward zone 21 is termed discharge region (region in which cooling fluid flows outwardly in the radial direction). The temperature of the field coil 8 is higher in the discharge region than in the suction region due to the rise of temperature of the cooling fluid 6 caused as a result of having cooled the upstream region (suction region) of the field coil 8. At the boundary region between the suction region and the discharge region, the temperature gradient is moderated due to the effect of heat conduction. Accordingly, the temperature distribution in the field coil 8 in the axial direction becomes sinusoidal as shown in FIG. 4.

As described above, the first embodiment of the present invention has an advantage that the field coil 8 can be almost uniformly cooled in its axial direction.

By using the structure wherein the radial ducts 9 having the suction holes 17 and the radial ducts 9 having the discharge holes 10 are repeated alternately, the rotor 3 can be easily elongated in its axial direction so that the resulted rotor can be used in a large-scale rotating electric machine having higher ratings. Since the rotor 3 can be fabricated in the structure similar to the conventional rotor of radial flow cooling type, reduction in production cost can be expected due to the ease with which the rotor is fabricated.

Embodiment 2

The second embodiment of the present invention will now be described in reference to FIGS. 5 through 8.

FIGS. 7A, 7B, 8A and 8B show cooling fluid ducts in the stator and the rotor according to the second embodiment of the present invention. The second embodiment differs from the first embodiment in that partition plates 40 are placed in the sub slot 7 at a predetermined interval. The rest of the structure in the second embodiment is the same as in the first embodiment. Prior to the description of the second embodiment itself, the reason why the present embodiment came to be employed will be explained in reference to FIGS. 5 and 6.

Figure 5:
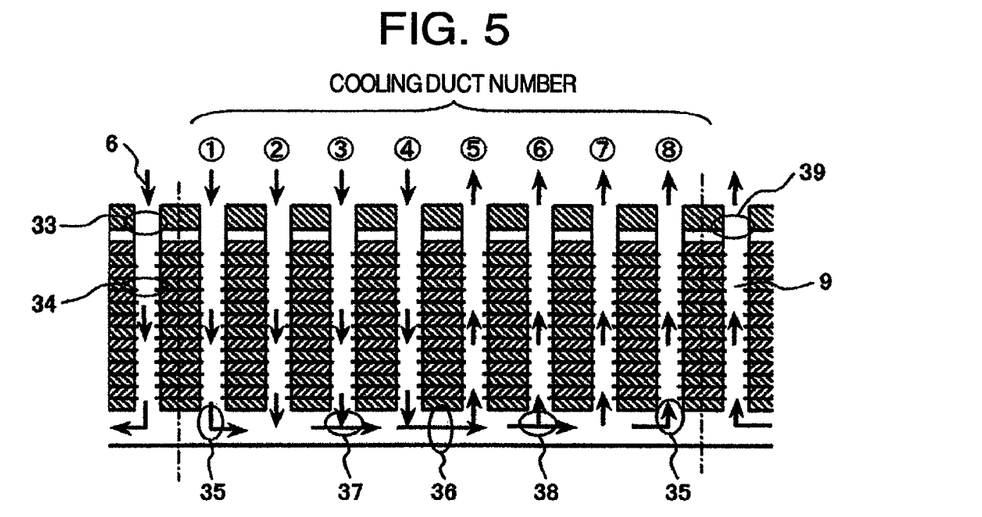
FIG. 5 shows in vertical cross section the ventilation ducts in the field coil in order to describe the flow resistance in the ventilation ducts.

FIG. 5 shows in vertical cross section the ventilation ducts (radial ducts) in the field coil 8 in order to describe the flow resistance in the ventilation ducts according to the present invention.

In FIG. 5, reference numeral 33 indicates the flow resistance in a suction part (suction part of the radial duct belonging to the reverse zone), 34 indicates the flow resistance in a radial duct, 35 indicates the flow resistance in a bent part, 36 indicates the flow resistance in the sub slot, 37 indicates the flow resistance in the junction part, 38 indicates the flow resistance in a branch part, and 39 indicates the flow resistance in a discharge part (discharge part of a radial duct belonging to the forward zone).

In the present invention, as described with the first embodiment, plural radial ducts 9 in the suction region are communicated with plural radial ducts 9 in the discharge region through the sub slot 7. In this structure, the flow rate of the cooling fluid may vary from one radial duct 9 to another depending on the different flow resistances in the respective ventilation ducts. In FIG. 5, four radial ducts 9 in the suction region and four radial ducts 9 in the discharge region (eight radial ducts 9 in total) are picked up for the purpose of description.

It is apparent that if the pressure loss over the radial ducts 9 is dominant as compared with the pressure loss over the entire fluid paths from intake to exhaust, the distribution of the flow rate will become uniform since the radial ducts 9 have the same structure.

Figure 6:
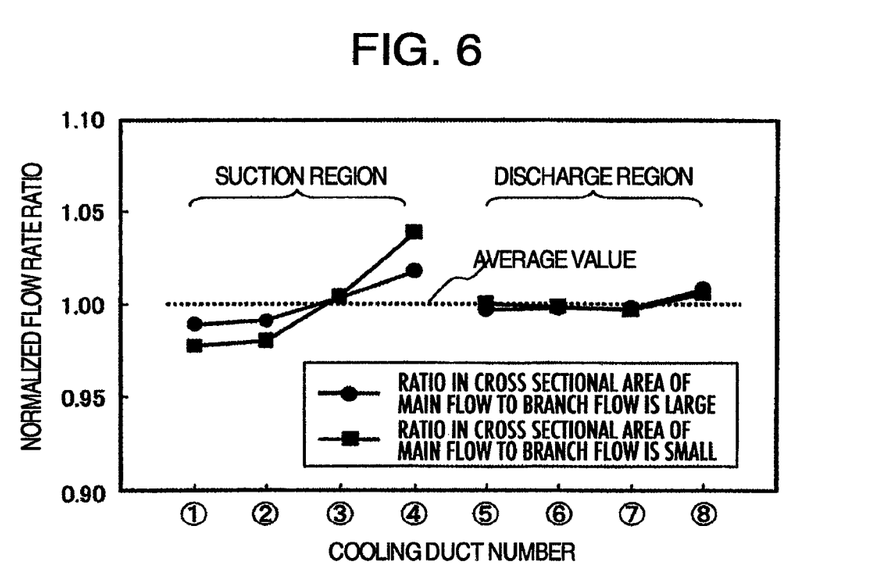
FIG. 6 graphically shows the results of calculation of the flow rate distribution in the radial ducts.

FIG. 6 graphically shows the results of calculation of the flow rate distribution in the radial ducts 9, with flow resistances taken into consideration at various parts in the fluid flow paths. FIG. 6 is a result representing relative values with respect to the uniformly distributed flow rate, calculated with the flow resistance in the sub slot 7 neglected. Fluid junction and branching out take place in the sub slot 7, and, in FIG. 6, the junction through the sub slot 7 in the axial direction is termed the "main flow" while the branched flows through the radial ducts 9 in the radial direction are termed the "tributary flow". In FIG. 6, round dots indicate the case where the ratio of the cross sectional area of the main flow to that of a tributary flow is large while square dots give the case where the same ratio is small. Concerning a rotor using the conventional radial flow cooling system, the cross sectional area of the fluid flow through the sub slot 7 is set larger than that of the fluid flow through the radial duct 9 so as to lessen the pressure loss through the sub slot 7 to the greatest extent possible to maintain as high a flow rate as possible. The curves obtained with the large ratio in FIG. 6 correspond to the case wherein the cross sectional area of the fluid flow through the sub slot 7 is the same as in the conventional case, whereas the curves obtained with the small ratio in FIG. 6 correspond to the case wherein the cross sectional area of the fluid flow through the sub slot 7 is half the cross sectional area of the fluid flow through the sub slot 7 for the conventional case. As evident from FIG. 6, if the flow resistance in the sub slot 7 is not neglected, the distribution of flow rates in the radial ducts 9 of the suction and discharge regions becomes uneven. Also, the greater the pressure loss incurred there, the less the average flow rate.

Figure 7A:
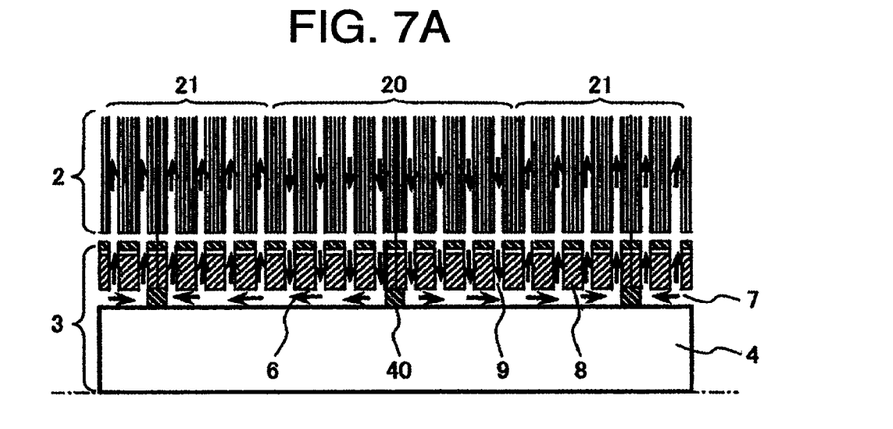
FIG. 7A partially shows in vertical cross section the upper halves of the rotor and the stator used in the second embodiment of the present invention.
Figure 7B:
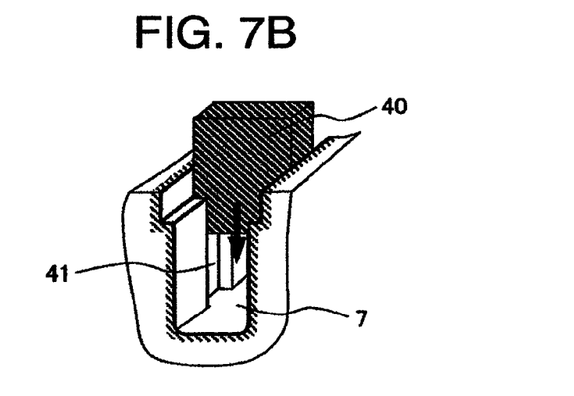
FIG. 7B shows in perspective view how the partition plate is attached to the sub slot in the second embodiment of the present invention.

FIGS. 7A and 7B show the second embodiment of the present invention, FIG. 7A showing in vertical cross section the upper halves of the rotor and the stator and FIG. 7B showing in perspective, partially enlarged view how a partition plate 40 is fitted into the sub slot.

The partition plate 40 is placed in the sub slot 7 by being fitted into a fixing groove 41 cut in the sub slot 7. Similar partition plates 40 are provided in such a manner that the sub slot 7 is uniformly partitioned into sub spaces arranged in the axial direction. Each sub space has a certain number of the radial ducts 9 belonging to the suction region (reverse zone) and the same number of the radial ducts 9 belonging to the discharge region (forward zone). In FIG. 7A are shown four radial ducts 9 for each of the reverse and forward zones.

The structure according to this second embodiment has advantages given as follows.

In the first embodiment described above, since the sub slot 7 is communicated with almost all the radial ducts 9 without provision of any partition plate, the effect of uneven distribution of flow rates may influence all the radial ducts 9 if there is asymmetry in structure due to errors in fabrication. On the contrary, in the second embodiment, the sub slot 7 is partitioned by the partition plates 40 in such a manner that the suction region and the discharge region are paired for each partitioned space, which serves as an independent ventilation structure. Consequently, even if uneven distribution of flow rates is generated in the radial ducts 9, its effect can be suppressed to the minimal degree. This is a notable advantage.

The partition plates 40 can be easily fitted into the sub slots 7 before the field coil 8 is placed in the field coil slots.

Figure 8A:
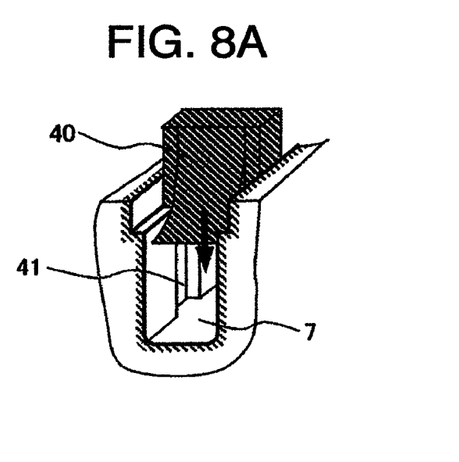
FIGS. 8A and 8B show the brief structure of the partition plate fitted into the sub slot in the second embodiment of the present invention.
Figure 8B:
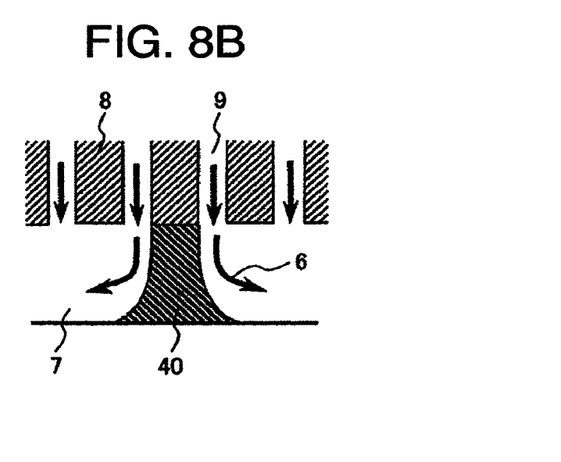

FIGS. 8A and 8B show a variation of the partition plate described above and used in the second embodiment of the present invention, FIG. 8A showing in perspective, partially enlarged view how a partition plate 40 is fitted into a sub slot 7, and FIG. 8B showing the partition plate 40 fitted in place. This modified partition plate 40 has curvatures on both the sides near the bottom thereof so that the curved surfaces serve as fluid guides 6. Therefore, this modified structure also has an advantage that the flow resistance in the bent part is decreased when the cooling fluid 6 is directed from the radial ducts 9 to the sub slot 7 or from the sub slot 7 to the radial ducts 9.

Embodiment 3

The third embodiment of the present invention will be described in reference to FIGS. 9 and 10.

Figure 9:
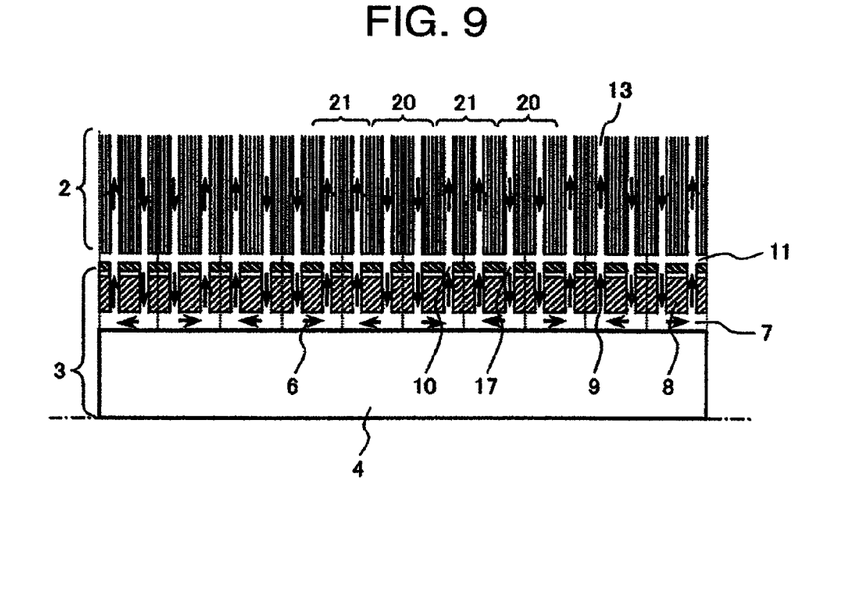
FIG. 9 partially shows in vertical cross section the upper halves of the rotor and the stator used in the third embodiment of the present invention.

FIG. 9 shows in vertical cross section the upper halves of the rotor and the stator of a turbine generator according to the third embodiment of the present invention.

In the present embodiment, as shown in FIG. 9, the reverse zones 20 and the forward zones 21 in the stator 2 are arranged alternately in the axial direction, each reverse zone 20 having two stator cooling ducts 13 and each forward zone 21 having two stator cooling ducts 13. The arrangement of the radial ducts 9 in the rotor 3 is the same as that of the stator cooling ducts 13 in the stator 2. According to this arrangement, a couple of the radial ducts 9 (13) for the inwardly radial flow and for the outwardly radial flow are adjacently disposed.

With this arrangement of radial ducts, the influence of the junction and branching of cooling fluid at the sub slot 7 as observed in the first embodiment can be eliminated. Consequently, the flow resistance through the flow path from the suction hole 17 to the discharge hole 10 is decreased so that the flow rate of the cooling fluid 6 through the radial ducts 9 is increased.

Figure 10:
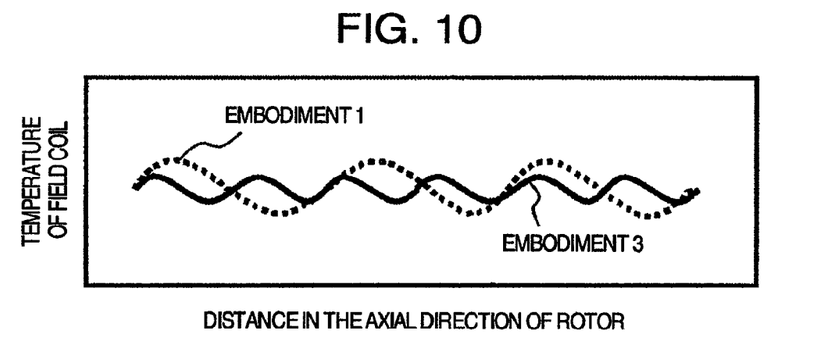
FIG. 10 shows the temperature distributions in the axial direction of the field coil, observed in the first and third embodiments of the present invention.

FIG. 10 shows the temperature distributions in the axial direction of the field coil 8 observed in the first and third embodiments of the present invention. Since the frequency of the alternation of the inwardly and outwardly radial flows in the third embodiment is higher as compared with that in the first embodiment, the period of sinusoidal undulation in the third embodiment is shorter than that in the first embodiment. Further, according to the third embodiment, the flow rate of the cooling fluid 6 can be increased so that the maximum temperature up to which the system is heated up is lowered.

As described above, the third embodiment of the present invention has an advantage that the field coil 8 can be further cooled down as the flow rate of the cooling fluid 6 through the radial ducts 9 can be increased. It also has an advantage that the field coil 8 can be uniformly cooled in the axial direction since uneven flow rates among the radial ducts 9 can be eliminated by employing the single flow path structure without branching and junction.

In a variation of the present embodiment, a refined structure can be employed wherein a suction hole 17 and a discharge hole 10 are arrange alternately. In another variation of the present embodiment, partition plates may be employed in the sub slot 7 as in the second embodiment so that the flows from and to the adjacent radial ducts 9 can be prevented from interfering with each other in the sub slot 7.

Embodiment 4

The fourth embodiment of the present invention will now be described in reference to FIGS. 11A, 11B and 12.

Figure 11A:
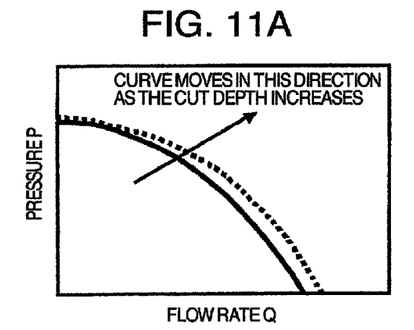
FIGS. 11A and 11B show the characteristics of the flow rate vs. fluid pressure in the downward and upward flow paths, respectively, in the gap pick up fluid cooling system employed in the fourth embodiment of the present invention.
Figure 11B:
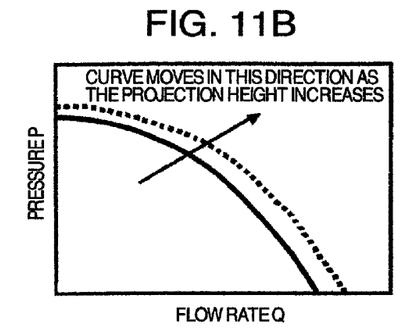

FIGS. 11A and 11B graphically show the Q-P characteristics in the gap pick up cooling system, FIG. 11A showing the characteristic of the pressure vs. flow rate with the depth hi of the cut 28 provided in the suction hole 17 taken as a parameter and FIG. 11B showing the characteristic of the pressure vs. flow rate with the height ho of the projection provided downstream of the discharge hole 10 taken as a parameter. As shown in FIGS. 11A and 11B, the greater is the depth hi of the cut, the greater are the effect of increasing pressure at the suction hole and the flow rate through the suction hole. On the other hand, the greater is the height ho of the projection, the greater are the effect of decreasing pressure at the discharge hole and the flow rate through the discharge hole. In the fourth embodiment of the present invention, these features are reflected in the structure.

Figure 12:
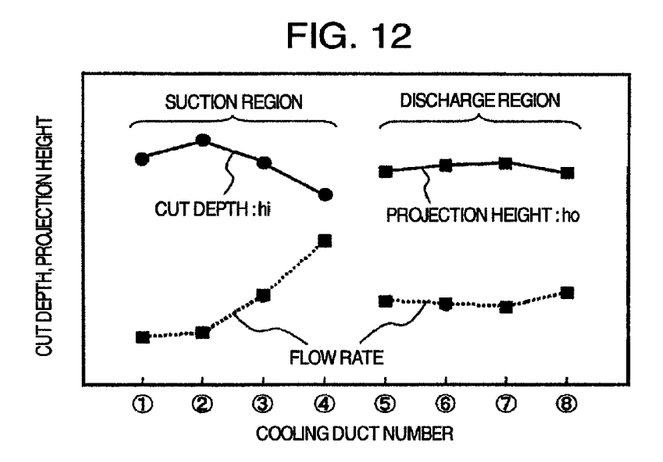
FIG. 12 shows the change in the depth of cut and the height of projection, in the axial direction, according to the present invention.

FIG. 12 graphically shows the axial distributions of the depth hi of the cut in the suction hole and the height ho of the projection at the discharge hole. If, in the case where the structure shown in FIG. 1 is employed, the flow rates of cooling fluid through radial ducts 9 are expected to be uneven, the depths hi of the cuts and the heights ho of the projections can be so adjusted as to render the uneven flow rates uniform. Thus, the fourth embodiment of the present invention has an advantage that the field coil can be uniformly cooled since the flow rates of cooling fluid through radial ducts can be made uniform without employing a complicated internal structure in the rotor 3. This advantage can be easily enjoyed by previously preparing wedges as standardized parts, having cuts with different depths hi and projections with different heights ho.

In a variation of the present embodiment, partition plates may be used in the sub slot 7 as in the second embodiment so that the flows from and to the adjacent radial ducts 9 can be prevented from interfering with each other in the sub slot 7.

Embodiment 5

The fifth embodiment of the present invention will now be described in reference to FIGS. 13 and 14.

Figure 13:
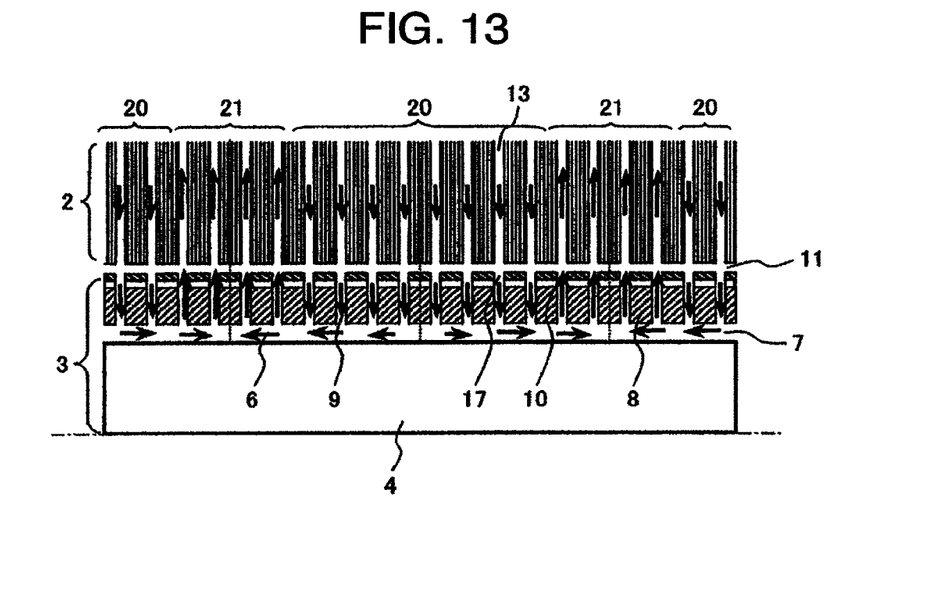
FIG. 13 shows in vertical cross section the upper halves of the rotor and the stator used in the fifth embodiment of the present invention.

FIG. 13 shows in vertical cross section the upper halves of the rotor and the stator of a turbine generator according to the fifth embodiment of the present invention.

In the following, only the difference of the present embodiment from the above described embodiments will be explained.

In the present embodiment, the number of the stator cooling ducts 13 belonging to the reverse zone 20 is made different in the axial direction from the number of the stator cooling ducts 13 belonging to the forward zone 21, whereas the number of the radial ducts 9 belonging to the suction region (corresponding to the reverse zone 20) in the rotor 3 is made similarly different in the axial direction from the number of the radial ducts 9 belonging to the discharge region (corresponding to the forward zone 21) in the rotor 3.

Namely, as shown in FIG. 13, among blocks each defined between two dotted vertical lines, including downward flow radial ducts 9 for fluid flow in the inwardly radial direction and upward flow radial ducts 9 for fluid flow in the outwardly radial direction, one especially near the central position in the axial direction of the rotor consists of four radial ducts 9 for fluid flow in the outwardly radial direction and two radial ducts 9 for fluid flow in the outwardly radial direction.

According to this duct allocation, the flow rate per unit time of cooling fluid 6 through the radial ducts 9 belonging to the discharge region (upward flow path system) becomes twice as large as the flow rate per unit time of cooling fluid 6 through the radial ducts 9 belonging to the suction region (downward flow path system), according as the number of the upward flow radial ducts is half the number of the downward flow radial ducts. Consequently, heat transfer coefficient can be made larger for the radial ducts 9 in the discharge region (upward flow path system), due to the higher flow rate of cooling fluid 6, than for the radial ducts 9 in the suction region (downward flow path system). As described above, the temperature of the field coil 8 tends to be higher in the discharge region than in the suction region since the temperature of the cooling fluid 6 is higher in the discharge region than in the suction region as the cooling fluid 6 reaches the discharge region after having cooled the suction region (upstream region).

According to this fifth embodiment, however, since the heat transfer coefficient in the discharge region is enhanced, the performance of cooling the field coil 8 can be improved.

Figure 14:
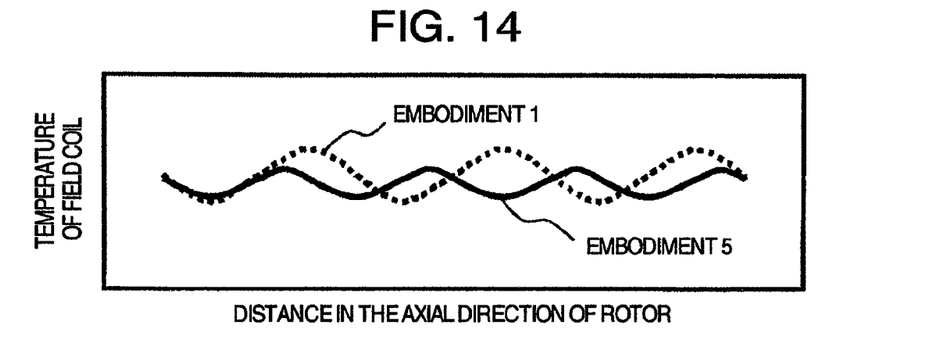
FIG. 14 shows the temperature distributions in the axial direction of the field coil, observed in the first and fifth embodiments of the present invention.

FIG. 14 shows the temperature distribution in the axial direction of the field coil 8 observed in the fifth embodiment of the present invention. Since the fifth embodiment is of structure in which cooling performance is enhanced in the discharge region, the maximum temperature reached by the field coil 8 is lowered as compared with that in the first embodiment.

Figure 15:
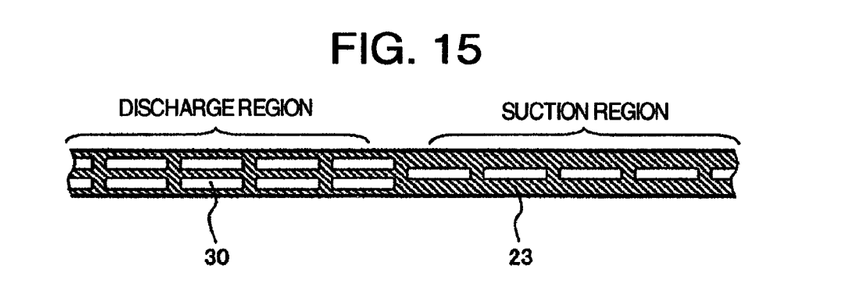
FIG. 15 shows in plan a variation of the structure of the conductor plate used in the fifth embodiment of the present invention.

FIG. 15 shows in plan a variation of the structure of the conductor plate used in the fifth embodiment of the present invention. In this variation, each of the constituent conductor plates 23 which constitute the field coil 8, is provided with ventilation holes 30 in such a manner that the number of the ventilation holes 30 contributing to the suction radial ducts (downward flow path system) is different from that of the ventilation holes 30 contributing to the discharge radial ducts (upward flow path system). Namely, as shown in FIG. 15, the ratio of the number of the ventilation holes 30 in the suction region to the number of the ventilation holes 30 in the discharge region is 1:2.

By the use of this structure, the number of the radial ducts 9 in the suction region is different from that of the radial ducts 9 in the discharge region, in the circumferential direction of the rotor. With this structure, the heat transfer area in the discharge region is twice as large as that in the suction region. On the other hand, the flow rate (flow velocity) per unit time of cooling fluid in the discharge region becomes one half. Since heat transfer coefficient is proportional to the flow velocity raised to the power of eight tenths, i.e. (flow velocity)$^{0.8}$, if the flow is turbulent, then the heat transfer coefficient, in case of the flow rate becoming one half, is reduced to about 57%. In this case, however, since the heat transfer area is doubled, cooling performance in the discharge region can be much improved as compared with that observed in the suction region.

As described above, the fifth embodiment of the present invention has an advantage that the maximum temperature which the field coil 8 may reach can be lowered since cooling performance for the outwardly radial flow in the discharge region can be much improved as compared with that for the inwardly radial flow in the suction region.

In a variation of the present embodiment, partition plates may be used in the sub slot 7 as in the second embodiment so that the flows from and to the adjacent radial ducts 9 can be prevented from interfering with each other in the sub slot 7.

By employing such a rotor structure according to the present invention, increase in capacity and reduction in cost can be attained through the elongation in the axial direction of the rotor not only in a turbine generator but also in any rotating electric machine having the rotor and the stator.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A rotating electric machine having a stator and a rotor disposed inside the stator with an air gap defined between them, the rotor having plural coil slots arranged at a predetermined interval in the circumferential direction of the rotor and a field coil of laminated structure fitted in the coil slots, wherein sub slots for serving as cooling fluid ducts in the axial direction of the rotor are provided at the bottoms of the coil slots;

radial cooling fluid ducts running in the radial direction of the rotor which communicate the sub slots with the air gap, are provided in the field coil of the rotor and juxtaposed in the axial direction of the rotor;

radial cooling fluid ducts are provided in the stator, running in the radial direction of the stator, corresponding in position to the radial cooling fluid ducts provided in the field coil of the rotor, and communicating the inner periphery of the stator with the outer periphery of the stator;

the radial cooling fluid ducts in the stator and the radial cooling fluid ducts in the rotor constitute a downward flow path system for guiding the flow of cooling fluid inwardly in the radial direction of the rotating electric machine and an upward flow path system for guiding the flow of cooling fluid outwardly in the radial direction of the rotating electric machine, the downward flow path system and the upward flow path system communicating with each other via the sub slots; and a cooling fluid circulation mechanism is provided to cause the cooling fluid to flow inwardly and outwardly in the radial directions.

2. The rotating electric machine as claimed in claim 1, wherein the cooling fluid circulation mechanism comprises:

a cooling fluid intake mechanism for causing cooling fluid to flow through the radial cooling fluid ducts in the stator constituting the downward flow path system, the air gap, and the radial cooling fluid ducts in the rotor constituting the downward flow path system, in this order named, into the sub slots; and a cooling fluid exhaust mechanism for causing cooling fluid to flow through the radial cooling fluid ducts in the rotor constituting the upward flow path system, the air gap, and the radial cooling fluid ducts in the stator constituting the upward flow path system, in this order named, out of the sub slots, and wherein cooling fluid is circulated through the cooling fluid intake mechanism, the downward flow path system, the sub slots, the upward flow path system, and the cooling fluid exhaust mechanism.

3. The rotating electric machine as claimed in claim 1, wherein wedges are provided in the peripheral surface of the rotor, covering the openings of the coil slots formed in the outer periphery of the rotor; and the wedges are also provided with ventilation holes serving as part of radial cooling fluid ducts in the rotor.

4. The rotating electric machine as claimed in claim 1, wherein the radial cooling fluid ducts formed in the field coil of the rotor is so disposed as to be perpendicular to the rotating shaft of the rotor, as viewed in the two-dimensional plane containing the radial and axial directions of the rotor.

5. The rotating electric machine as claimed in claim 3, wherein cuts are formed in the ventilation holes provided in the wedges for the downward flow path system so as to create regions for increasing the static pressure of cooling fluid; and projections are provided at the ventilation holes formed in the wedges for the upward flow path system so as to create regions for decreasing the static pressure of cooling fluid.

6. The rotating electric machine as claimed in claim 5, wherein at least one of the depths of the cuts and the heights of the projections, provided at the wedges are varied along the coil slots in the axial direction of the rotor.

7. The rotating electric machine as claimed in claim 1, wherein the number of the radial cooling fluid ducts constituting the downward flow path system passing through the stator and the rotor is made different from the number of the radial cooling fluid ducts constituting the upward flow path system passing through the rotor and the stator.

8. The rotating electric machine as claimed in claim 7, wherein the number of the radial cooling fluid ducts constituting the downward flow path system passing through the stator and the rotor and the number of the radial cooling fluid ducts constituting the upward flow path system passing through the rotor and the stator, are varied depending on the positions in the axial direction of the rotor.

9. The rotating electric machine as claimed in claim 1, wherein at least one of the number of the radial cooling fluid ducts in the stator and the number of the radial cooling fluid ducts in the rotor are varied in the circumferential direction of the rotor, depending on the positions in the axial direction of the rotor.

10. The rotating electric machine as claimed in claim 1, wherein plural partition plates are provided in the sub slots so as to provide partitions for the flow of cooling fluid in the axial direction.

11. The rotating electric machine as claimed in claim 10, wherein each of the partition plates has on its surfaces curvatures that enable the cooling fluid to smoothly change the direction of flow when it flows out of the radial cooling fluid ducts in the rotor into the sub slot in the axial direction or when it flows from the sub slot into the radial cooling fluid ducts in the rotor.

\* \* \* \* \*